Aug. 29, 1961   M. A. EGGENBERGER   2,997,987
HYDRAULIC REMOTE POSITIONING DEVICE
Filed Dec. 15, 1958
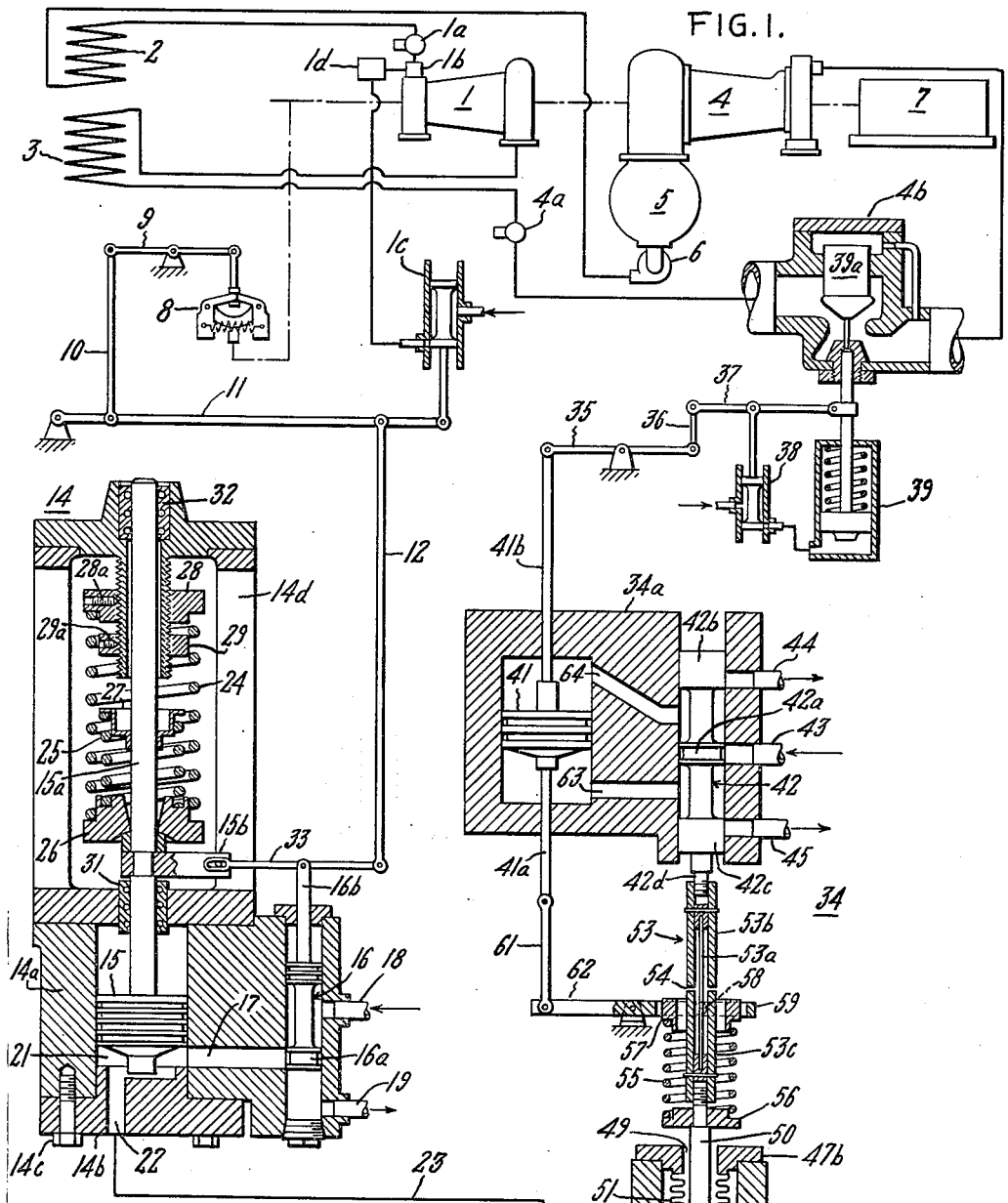
INVENTOR
MARKUS A. EGGENBERGER
BY
HIS ATTORNEY

United States Patent Office 2,997,987
Patented Aug. 29, 1961

2,997,987
HYDRAULIC REMOTE POSITIONING DEVICE
Markus A. Eggenberger, Schenectady, N.Y., assignor to General Electric Company, a corporation of New York
Filed Dec. 15, 1958, Ser. No. 780,542
6 Claims. (Cl. 121—41)

This invention relates to a hydraulic-mechanical remote positioning device, and more particularly to a device for remottly positioning a valve to control an elastic fluid flow, specifically the motive fluid in a steam powerplant.

In a large compound turbine-generator powerplant arranged to reheat the motive fluid, there is generally provided, in addition to the control valve at the inlet to the high pressure turbine, an "intercept valve" which is placed between the reheater and the next lower pressure stage of the turbine. In the event of overspeed of the turbine due to loss of load on the generator, the flow of steam to the turbine is reduced by means of the control valve and the intercept valve which are controlled by a speed control device which can use a centrifugal governor as a speed sensing element. Due to the physical location of these two sets of valves, particularly the intercept valves, it is often necessary to build long linkages to transmit the signal from the speed control device to these valves.

An additional difficulty which is experienced when controlling two different valve sets from a single speed control device is that the opening characteristics of the control valves and the intercept valve may be different. Thus where linkages to the two valve sets are positioned by a single device, it is often necessary to compromise between what would otherwise be the optimum valve controlling movements. For example, it may be desired that the opening of the intercept valve take place slowly for the first part of its stroke and rapidly for the remaining portion of the stroke. In order to accomplish this end, the valve has to open as a non-linear function of the governor movement.

Accordingly, it is an object of the present invention to provide an improved hydraulic servo mechanism which can remotely position a valve in response to a signal from a speed or other condition-sensing device remote from this valve without the necessity of intervening mechanical linkages and without substantial pressure losses in the hydraulic fluid.

A further object is to provide an improved device to convert a linear movement of a control device into a hydraulic pressure in a non-linear manner such that, by a converting mechanism from this hydraulic pressure back to a mechanical motion, a desired valve opening characteristic can be produced.

Generally stated, the invention is practiced by providing a "transmitter" which receives a mechanical signal from the speed governor and converts it into a hydraulic pressure signal. This pressure signal, in the embodiment shown, is a non-linear function of the mechanical input signal. Located adjacent the intercept valve is a "receiver" which takes the hydraulic signal from the transmitter and reconverts it into a mechanical output to position the valve. Thus the usual mechanical linkage is replaced by a single hydraulic conduit.

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a diagrammatic representation of the remote positioning device as used on a turbo-generator powerplant; and FIG. 2 is a graph illustrating the non-linear variation of hydraulic pressure versus the mechanical transmitter input.

Referring now to FIG. 1, the invention is illustrated as applied to a high pressure steam turbine 1 receiving steam from the steam generator 2 by way of the main stop valve 1a and the control valve 1b. The operation of the control valve 1b need not be described for an understanding of this invention, but has been simplified by depicting it as controlled by a pilot valve 1c and a valve gear 1d connected to a suitable source of oil under pressure (not shown). The steam, having expanded through high pressure turbine 1, travels through the reheater 3 and then passes to the intermediate and low pressure section 4 of the turbine by means of the reheat stop valve 4a and the intercept valve 4b. The steam is condensed in condenser 5 and then returned to the steam generator 2 by means of boiler feed pump 6. The output of the steam turbines 1 and 4 is used to drive a load such as a generator 7.

In the event of a loss of load on the generator, an overspeeding of the turbine will occur which is immediately sensed by the speed governor, shown as a centrifugal governor 8. The resulting movement of governor 8 is transmitted by means of lever 9, and link 10 to the lever 11 which, in turn, controls the pilot valve 1c of control valve gear 1d to decrease the flow of motive fluid to the high pressure turbine 1. Also attached to the lever 11 is connecting link 12 which serves as the input to the transmitter. The movement of link 12 will be used indirectly to control the opening and closing of the intercept valve 4b by means of the novel transmitter and receiver which are the particular subjects of this invention.

The "transmitter," shown generally at 14, consists of a single-acting spring-loaded piston 15 and a pilot valve 16 operating in a common casing 14a. The pilot valve 16 has a control land 16a, which normally remains in its "on-port" position to control the flow of hydraulic fluid to and from a pressure chamber 21 through connecting conduit 17. The pilot valve 16 is suppled by a source of hydraulic fluid under pressure (not shown) through conduit 18 and discharges to the sump through discharge conduit 19. The hydraulic fluid is admitted to the pressure chamber 21 which is sealed from the outside by closure plate 14b held in place by some means such as bolts 14c. The closure plate 14b is provided with a port 22 which is connected to conduit 23 for transmitting the hydraulic pressure signal to the receiver.

A non-linear spring bias may be provided by compression springs 24 and 25 which are housed in the spring housing 14d and disposed about the transmitter piston rod 15a. Both springs 24 and 25 rest upon a common retaining ring 26 which is disposed on piston rod 15a and held in place by the bias of spring 24. Spring 25 is maintained coaxial with piston rod 15a by a floating retainer ring 27. Spring 24, on the other hand, is maintained coaxial with the piston rod by means of the internally threaded retaining ring 28 which is provided with a locking set screw 28a for adjustment. As the piston travels upward, the floating retaining ring 27 will come in contact with abutment ring 29 which is likewise provided with an adjusting set screw 29a. Thus, during the course of piston travel, two different spring gradients will be acting to oppose the hydraulic pressure in chamber 21, depending upon the location of the piston.

FIG. 2 gives a graphical representation of the pressure in chamber 21 versus the translation of the piston 15. In the lower portion of its travel, piston 15 is opposed only by the bias of spring 24 which is represented by the line a—b. At a predetermined point, piston 15 must resist the compressive force of both springs 24 and 25, thus giving rise to a different spring constant represented by the line b—c on the graph. It is, of course, understood that at intermediate points on a—b and b—c the opposing spring force will still vary with the position assumed by the piston but it will vary at a different rate depending upon whether the piston is traversing a—b or b—c. The reason for this non-linear relationship of pressure with transmitter piston movement lies in the particular operating characteristics of the intercept valve, which require that the valve be opened slowly at first and then opened at a greater rate in order to give the desired change in flow rate. It is, of course, understood that a non-linear characteristic can also be produced by a specially wound single spring of the proper shape.

In order to reduce friction in the transmitter as much as possible, ball bushings 31, 32 are provided in the spring housing 14d at the points where the piston rod 15a passes through the spring housing and the piston 15 defines a small clearance with the walls of the cylinder 14a.

The coordinating means which enables the mechanical input through the connecting link 12 to be converted to a non-linear pressure signal in conduit 23 consists of a "floating" lever 33 which operates in conjunction with an extension piece 15b carried on piston rod 15a, the pilot valve stem 16b, and the link 12 of the input linkage. Lever 33 is pivoted to all three members as shown in FIG. 1.

The operation of the floating lever 33 is as follows. Downward movement of the link 12 causes lever 33 to pivot clockwise on member 15b which depresses pilot valve 16 to admit hydraulic fluid to the pressure chamber 21. Since the oil supply pressure is always higher than that existing in pressure chamber 21, hydraulic fluid will flow into pressure chamber 21 forcing the piston 15 upward against the biasing force of the compression springs 24, 25. This upward movement of the left-hand side of link 33 will return the pilot valve 16 to its "on-port" position, in which the supply of operating liquid is stopped. Thus a downward movement of the link 12 has resulted in upward movement of the piston 15, with the net effect being a pivoting of link 33 around the "on-port position" of the pilot valve. However, the upward movement of piston 15 has necessitated that an increased pressure exist in pressure chamber 21 due to the reactive force of the compression springs 24, 25. This pressure is transmitted through conduit 23 to the receiver.

Looking now at the "receiver," shown generally as 34, it can be seen that the input signal comprises the variable hydraulic pressure in conduit 23, and that the output is a mechanical movement controlling the lever 35. Lever 35 serves to position the intercept valve 4b through appropriate linkage members 36 and 37 which operate a pilot valve 38. The pilot valve admits oil to a spring-loaded hydraulic cylinder 39 which controls the movement of intercept valve disk 39a. The operation of this hydraulic servo will be obvious from the drawing.

The receiver 34 consists of a double-acting piston 41 and a pilot valve 42 which are mounted to slide in cylindrical bores in the common housing 34a. A source of oil under pressure (not shown) supplies the pilot valve by means of an inlet conduit 43. The pilot valve is of a conventional three-land type having a central controlling land 42a and top and bottom drain-blocking lands 42b and 42c respectively. Drain conduits 44 and 45 exhaust the fluid to a sump (not shown). Thus a slight movement of the pilot valve either up or down will cause the receiver piston 41 to "follow" the direction of movement of the pilot valve and to continue in this direction unless the flow of oil is checked by returning the pilot valve to its "on-port" position.

The hydraulic signal from the transmitter is received in the pressure chamber 46 of the pressure-tight casing 47a through inlet conduit 48. A cover plate 47b, having a central aperture 49 receiving a pilot valve extension 50, is secured to the top of casing 47a. A flexible bellows 51, which extends between the cover plate 47b and a lower flattened portion 52 on the pilot valve extension 50, completes the sealing of the pressure chamber 46. Since one side of the bellows is open to the atmosphere by way of clearance space 49, pressure variations in the chamber 46 will cause the end disk portion 52 to reciprocate axially and thus to move the pilot valve 42 in response to signal pressure variations.

The extension piece 50 is connected to the pilot valve 42 by a "self-aligning link," shown generally at 53. This special link ordinarily transmits the axial thrust entirely by a wire 53a. Any slight misalignment of the extension 50 with respect to the axis of the pilot valve is absorbed by the wire 53a flexing laterally. Under normal conditions, the pilot valve 42 "floats" in its cylinder bore on a film of oil and the tension and compression forces imposed upon wire 53a will be slight. Under severe compressive stress, however, such as caused by a foreign particle getting caught between the land and the port, the wire 53a will tend to buckle. To prevent this from happening, cylindrical members 53b and 53c are threaded onto the end of extension 50 and pilot valve stem 42d. The ends of cylindrical members 53b and 53c are separated by a slight axial gap 54, which is only on the order of 1/64 inch. Thus before the wire 53a has a chance to buckle beyond its elastic limit, the gap 54 will close and the entire thrust will be taken by the stronger members 53b, 53c.

In order to restrain the axial movement of the bellows-actuated extension member 50, a compression spring 55 is provided which nests in a retaining ring 56. The upper end of compression spring 55 engages a floating retaining ring 57, provided with gimbal pins 58, and supported in gimbal ring 59. This compression spring 55 adjusts the restoring force to the pilot valve when it moves from its "on-port" position. In order to accomplish this, a piston rod extension 41a from the receiver piston 41 is connected through link 61 and lever 62 to the gimbal ring 59. Actually, as shown, the gimbal ring 59 is formed as an integral part of lever 62. A top piston rod 41b transmits movement of the piston 41 to the previously mentioned lever 35.

It will be apparent that a pressure increase in chamber 46 will move pilot valve 42 upward, admitting fluid to the underside of piston 41 through conduit 63. This same movement of the pilot valve will uncover the upper drain port 44 and allow fluid to exhaust from the cylinder through conduit 64. As the piston 41 moves upward, there will be a corresponding downward movement of the floating retaining ring 57 due to the mechanical linkage 61, 62, which downward movement will further compress spring 55. This additional compressive force will be transmitted to the extension member 50 and will increase the restraining force on the bellows 51 to return the pilot valve to its on-port position. Thus the piston 41 will have assumed a new position which corresponds to the hydraulic pressure increase in chamber 46 whereas the bellows member 52 returns to its previous position. By imposing its own spring restoring force, the receiver will produce a mechanical output movement of top piston rod 41b which is directly proportional to the hydraulic pressure input to chamber 46. The constant of proportionality achieved will, of course, depend upon the spring constant of compression spring 55 and the lever ratio of the two arms of lever 62.

The operation of the transmitter and receiver will now be apparent, but may be outlined briefly, as follows. In the event of turbine shaft speed increases, the weights of centrifugal governor 8 will move outward and move lever 11 counterclockwise to position pilot valve 16 and establish a decreased pressure signal in chamber 21, which is communicated to the receiver 34. The decrease in pressure will allow the bellows 51 to expand downward. The receiver pilot valve 42 will follow this downward movement. The resulting downward movement of piston 41 positions intercept valve disk 39a in the closing direction, and decreases the compressive force of spring 55 so that pilot valve 42 is returned toward its "on-port" position.

This remote positioning device offers many advantages which are not obtainable with mechanically connected governing systems. For example, the system incorporates a built-in safety feature whereby loss of hydraulic fluid pressure at any point will result in the intercept valve being closed automatically. For example, loss of fluid in the transmitter pressure chamber 21, the connecting conduit 23, or the bellows pressure chamber 46 in the receiver will cause the bellows 51 to expand, which causes pilot valve 42 and main piston 41 to move in a downward direction, to close valve 39a. Likewise, since the pressure on the lower side of piston 41 must always be greater than that on the upper side in order to balancing spring 55, loss of oil pressure in supply conduit 43 will cause piston 41 to drop and again close the valve 39a. This "fail-safe" feature is very important in a turbine governing system.

The "gain" or sensitivity of the main pistons 15, 41 of both the transmitter and the receiver to the movements of their respective pilot valves 16, 42 close to the "on-port" position can be modified by slightly changing the amount by which the control lands 16a and 42a overlap their respective supply ports. Thus if it is desired to increase or decrease the "gain" on either transmitter or receiver in order to prevent "hunting," it is necessary only to withdraw the pilot valve and insert a new pilot valve having slightly modified land overlap.

Another important advantage of this remote positioning device is that the transmitted hydraulic pressure in conduit 23 is substantially independent of the supply pressure furnished to the transmitter and receiver pilot valves. The pressure in transmitter pressure chamber 21 is dependent only upon the position of the piston and upon the spring constants of the compression springs used. Thus, occasional fluctuations in supply oil pressure will not affect the positioning of the valve 39a.

An additional advantage is that the hydraulic transmitting conduit 23 is primarily a transmitter of pressure only, the quantity of flow being limited by the transient change in volume of pressure chamber 46 which is on the order of less than one cubic inch. The steady state position of the end disk portion 52 on bellows 51 is, of course, always the same, regardless of the pressure in chamber 46. Therefore, there will be very slight flow taking place in conduit 23 during operation, which flow may be in either direction depending upon the position of pilot valve 16. Since conduit 23 is primarily a pressure transmitter, it can be constructed of small diameter piping and there will be no significant lag in operation due to pressure drop.

Several modifications of the remote positioning device of this invention will be apparent to those skilled in the art. For instance, more than one servo-motor 39 could be remotely operated using a single transmitter, there merely being an additional line from the transmitter to the new receiver.

Also, other methods may be used to achieve the non-linear restraining force achieved here by using the two springs 24, 25. For example, a "variable gradient spring" may be used, which incorporates the desired non-linear characteristics in a single spring. Or if it is desired to transmit a pressure signal which varies as a linear function of the position input, a single constant gradient spring may be used in place of the two springs employed in my device.

These and many other advantages will be apparent to those skilled in the art and while there has been described what is at present considered to be the preferred embodiment of the invention, it will be understood that still other modifications may be made, and it is intended to cover in the appended claims all such modifications as fall within the true spirit and scope of this invention.

What I claim as new and desire to secure by Letters Patent of the United States is:

1. A positioning device for transmitting a function of a mechanical movement to a remote location comprising transmitter means for transmitting a pressure signal including a static pressure chamber, pilot valve means positioned in accordance with a mechanical input movement to admit and discharge pressurized fluid to and from said static pressure chamber, and first means responsive to the pressure in the static pressure chamber to restore said pilot valve means to a no-flow position; receiver means having second pressure responsive means for receiving said pressure signal and generating a mechanical output which is a function of the pressure signal, said mechanical output being used also to quickly return the second pressure responsive means to its original position, whereby no substantial quantity of fluid is required by the receiver to generate the mechanical output signal; and conduit means connecting the first pressure responsive means to the second pressure responsive means to transmit the pressure signal.

2. The combination according to claim 1 where said first pressure responsive means is invariably biased against the pressure in said static pressure chamber according to its position, whereby the pressure signal transmitted by the transmitter is a non-linear function of the position of said first pressure-responsive means.

3. In a hydraulic remote positioning device, the combination of transmitter means including a source of fluid under pressure, a first transmitter pressure chamber having first pressure responsive means therein, a transmitter pilot valve disposed to control the flow of fluid from said source to said first pressure chamber, first biasing means acting against said first pressure responsive means to oppose the pressure in said transmitter pressure chamber whereby the pressure is a function of the position of the first pressure responsive means, and first linkage means connecting the pilot valve to the first pressure responsive means whereby the neutral position of the pilot valve is restored; receiver means including a second receiver pressure chamber having second pressure responsive means therein, a receiver pilot valve connected to a source of fluid under pressure and actuated by said second pressure responsive means, a third receiver pressure chamber connected to receive fluid from the receiver pilot valve and having piston means therein positioned by fluid admitted by the receiver pilot valve, said piston means including second linkage means actuated thereby and having a portion arranged in juxtaposition with the second pressure responsive means, second biasing means connected between said linkage means portion and the second pressure responsive means to impose a biasing force on the second pressure responsive means in opposition to the pressure in said second receiver pressure chamber and as a function of the position of said piston means, whereby both the receiver pilot valve and the second pressure responsive means are quickly restored to their original positions by movement of the piston means to maintain the second pressure responsive means in substantially the same position; and conduit means communicating a signal pressure from the transmitter pressure chamber to said first receiver pressure chamber.

4. A hydraulic remote valve positioning device for controlling the flow of an elastic fluid in a turbine power plant comprising governor means producing a first mechanical signal indicative of turbine shaft speed, transmitter means receiving said mechanical signal, said transmitter means including a source of fluid under pressure, a first transmitter pressure chamber having first pressure responsive means therein, a transmitter pilot valve disposed to control the flow of fluid from said source to said pressure chamber, first biasing means acting against said first pressure responsive means to oppose the pressure in said transmitter pressure chamber whereby the pressure is a function of the position of the first pressure responsive means, and first linkage means connecting the transmitter pilot valve to the first pressure responsive means whereby the neutral position of the transmitter pilot valve is restored; receiver means, including a second receiver pressure chamber having second pressure responsive means therein, a receiver pilot valve connected to a source of fluid under pressure, second linkage means connecting the receiver pilot valve to the second pressure responsive means and actuated by said pressure responsive means, a third receiver pressure chamber connected to receive fluid from the receiver pilot valve and having third pressure responsive means therein positioned by fluid admitted from the receiver pilot valve, third linkage means connected to said second pressure responsive means and including a movable portion arranged in juxtaposition with and separated from said second linkage means, second biasing means interposed between the third linkage movable portion and the second linkage means to impose a biasing force on the second pressure responsive means in opposition to the pressure in said second receiver pressure chamber and a function of the position of said third pressure responsive means, whereby both the receiver pilot valve and the second pressure responsive means are quickly restored to their original positions by movement of the third pressure responsive means, conduit means interconnecting the first transmitter pressure chamber and the second receiver pressure chamber to transmit pressure variations with substantially no flow therebetween, and valve operating means connected to the third piston means to position a valve located remote from said governor means.

5. A positioning device for transmitting a non-linear function of a mechanical movement to a remote location comprising transmitter means for transmitting a pressure signal including a static pressure chamber, an input member, pilot valve means positioned by said input member to admit and discharge pressurized fluid to and from said static pressure chamber, and first pressure responsive means connected to be positioned by said pressurized fluid to return the pilot valve means to a no-flow position, said first pressure responsive means also being biased against the pressure in said static pressure chamber according to its position, whereby the pressure in said static pressure chamber is a non-linear function of the position of said input member; receiver means having second pressure responsive means for receiving said pressure signal and generating a mechanical output which is a function of the pressure signal, said mechanical output being used also to quickly return the second pressure responsive means to its original position, whereby no substantial quantity of fluid is required by the receiver to generate the mechanical output signal, and conduit means connecting the first pressure responsive means to the second pressure responsive means to transmit the pressure signal without substantial flow therebetween.

6. A positioning device for transmitting a function of a mechanical input movement to a remote location comprising a transmitter including a transmitter pressure chamber with a single acting piston therein balanced on one side by hydraulic fluid under pressure in said pressure chamber and on the other side by first spring biasing means, whereby the pressure of the hydraulic fluid in the chamber varies according to the position of the piston, an input member, first means controlling the quantity of hydraulic fluid in said chamber according to the displacement of said input member, whereby the pressure in said chamber is a predetermined function of the displacement of the input member; a receiver including a receiver pressure chamber having pressure responsive means therein, a pilot valve actuated by said pressure responsive means and connected to a source of fluid under pressure, an output member positioned by the fluid as controlled by said pilot valve, said output member also connected through second spring biasing means to impose a restoring force urging both the pilot valve and the pressure responsive means to their original positions; and conduit means connecting said transmitter pressure chamber with said receiver pressure chamber to transmit a pressure signal therebetween without substantial pressure drop.

References Cited in the file of this patent
UNITED STATES PATENTS

| 862,867 | Eggleston | Aug. 6, 1907 |
| 2,237,799 | Van Nest | Apr. 8, 1941 |
| 2,313,002 | Mennesson | Mar. 2, 1943 |
| 2,637,301 | Burdick | May 5, 1953 |
| 2,647,493 | Whitehead | Aug. 4, 1953 |

OTHER REFERENCES

"Power," December 1945, page 88 relied on.